Aug. 23, 1932.   E. JAMES   1,873,592
PIPE CONNECTION
Filed June 2, 1928
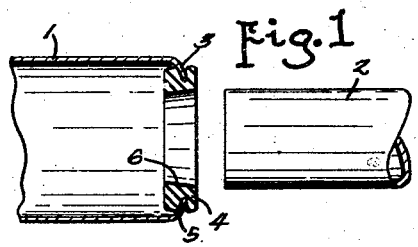
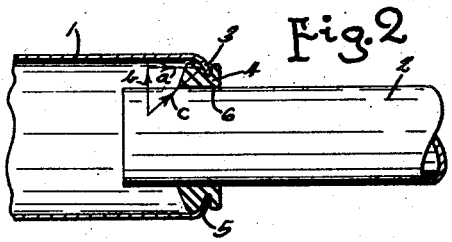
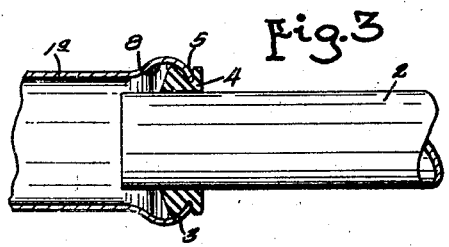
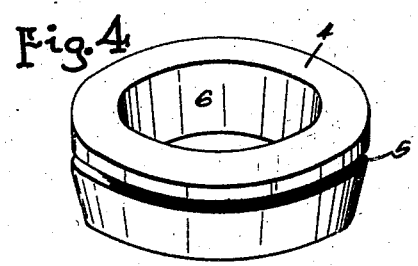
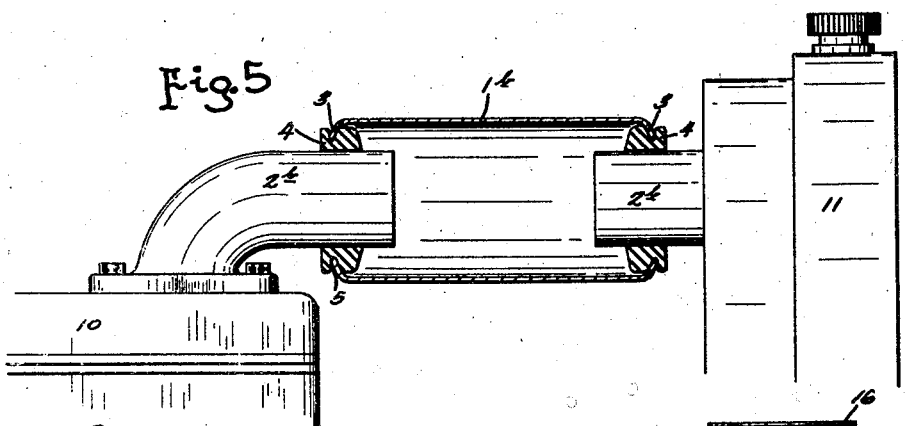
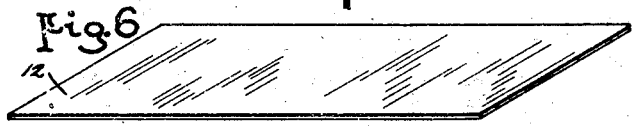
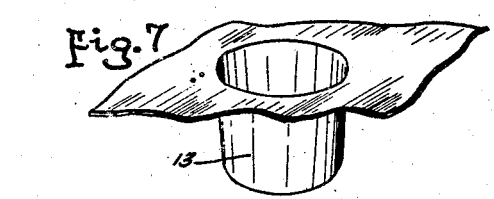
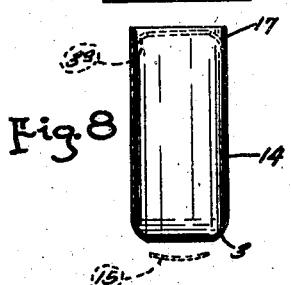
Edward James
Inventor
by Smith and Freeman
Attorneys Patented Aug. 23, 1932

1,873,592

UNITED STATES PATENT OFFICE

EDWARD JAMES, OF CLEVELAND, OHIO, ASSIGNOR, BY MESNE ASSIGNMENTS, TO HAROLD ELNO SMITH, OF CLEVELAND HEIGHTS, OHIO

PIPE CONNECTION

Application filed June 2, 1928. Serial No. 282,371

This invention relates to pipe connections and has for its object the provision of new, improved, simplified, and cheapened means for connecting together two pipes in leakproof relation, while permitting ready separation thereof and allowing a considerable degree of relative movement therebetween and this without threading or otherwise interlocking the same. Another object of the invention is the provision of a new, simplified joint for connecting together the engine and radiator of a self-propelled vehicle, and the provision of such a joint that can be made quickly and inexpensively out of sheet metal, although my improvements are not limited to this use or material. Another object of the invention is the provision of a telescoping pipe joint which can be made with a minimum amount of deformation of the parts, and of particularly thin metal; while further objects and advantages of the invention will become apparent as the description proceeds.

The present invention is a modification of the devices illustrated and claimed in my copending applications filed May 11, 1928, Ser. Nos. 276,858 and 276,859, designed chiefly to simplify the shaping of the end of the receiving member, to permit the same to be made with less deformation, to facilitate the construction of the device out of sheet metal, and to provide a modified mode of interfitting relation between the receiving member and the gasket.

Fig. 1 illustrates my inventive idea in its simplest form, the parts being shown in entering but uncoupled relation; Fig. 2 illustrates the same parts in coupled relation; Fig. 3 illustrates a modified shape of the receiving member; Fig. 4 is a perspective view of a rubber gasket drawn to larger scale; Fig. 5 shows my present improvements applied as a connection between an engine and radiator; and Figs. 6, 7, and 8 illustrate successive steps in the production of such radiator connection from sheet metal.

As in the case of the copending applications above mentioned, my improvement comprehends the use of two mating pipe elements, a receiving element 1 and an entering element 2. At its mouth end the receiving element is formed with an inwardly-projecting flange 3 defining an opening which is larger than the exterior of the entering member 2. Seated in the mouth of this receiving element is a gasket 4 of elastic, flexible, material, preferably soft rubber, soft vulcanized oil, or some substance of similar nature. This gasket is formed with an external circumferential groove 5 which receives the lip 3, this groove being preferably slightly narrower at the outer end of the gasket than the inner end thereof. Said gasket also has an axial bore 6 of a size to receive and grip tightly the exterior of the entering member 2 and said bore is preferably slightly tapered, being smaller at that end which is further from the groove 5.

Said gasket being soft and flexible is readily positioned in the mouth of the member 1 as shown in Fig. 1. If then the entering member 2 be inserted, the inner end of the gasket is swelled outwardly more than the outer end owing to the unequal diameter of the bore. As a result the member 2 is gripped tightly and leakage between the two pipes prevented. Owing to the swelling out of the gasket illustrated in Fig. 2, any increase of pressure inside the member 1 tends to grip the entering member the more tightly. Any force tending to withdraw the member 2, as shown at $a$ in Fig. 2 combines with the expanding force $b$ already acting upon the gasket, to produce a diagonal force indicated at $c$ and I preferably make the flange 3 with its face so slanted as to be substantially perpendicular to this diagonal line, since this is also easier to accomplish than a more abrupt flange. It is difficult to separate the parts by direct pull, although separation can generally be effected by relative twisting. In Fig. 3 I have shown the body of the receiving member 1ª as reduced in size while maintaining the flange 3 of the same size, which is effected by forming an annular recess 8 between the same. This renders the shape of member 1ª essentially the same as that shown in the copending applications previously mentioned, but the gasket is applied as in Figs. 1 and 2 herein.

In Fig. 5 I have shown a double-ended coupling member 1ᵇ containing my present improvements, its ends receiving the opposed nipples 2ᵇ—2ᵇ of an automobile engine 10 and radiator 11, respectively. The main advantages of this connection are that it is very cheap, can be made of thin metal, can be applied without tools, does not require that the nipples be in line, permits relative motion of said nipples, and is safe against leakage or accidental uncoupling.

While it is obvious that this coupling can be made out of glass or porcelain or other ceramic substance, or out of cast metal, or out of ordinary tubing suitably swaged to shape, I apprehend that the easiest and cheapest mode of making the same is to draw it from a flat blank of sheet metal as shown in Figs. 6, 7, and 8. Starting with a flat blank 12, the drawing process generally requires a plurality of stages, exhibiting a partially formed, shallow cup 13 at an intermediate stage, and at last a deeply elongated cup 14 shown in Fig. 8, which is finished by stamping out the bottom as shown at 15 to leave the inclined flange 3, and shearing away the top-rim 16, leaving a plain lip 17 which can then be reheated (preferably by dipping in molten metal) and swaged inwardly to define the corresponding flange 3ᵃ shown in dotted lines.

It will be understood that I do not limit myself to any of these modes of making the device, but merely suggest the same as feasible and practical procedures; also I do not limit myself to any of the particular forms, materials, or designs herein shown or in any other wise except as specifically recited in my several claims which I desire may be construed broadly, each independent of limitations contained in other claims.

Having thus described my invention what I claim is:

1. In a flexible, detachable pipe coupling, a receiving member having at its end an annular, inwardly-projecting, slant-sided flange, an annular gasket of elastic yielding material located partly inside and partly outside said flange and having an external circumferential groove receiving said flange, and an entering member slidably and flexibly mounted therein and smaller than the aperture defined by said flange, said gasket having a bore therethrough which is normally slightly smaller than the external diameter of said entering member.

2. In a flexible, detachable pipe coupling, a receiving member having at its end an annular, inwardly-projecting flange, an annular gasket of elastic yielding material located partly inside and partly outside said flange and having an external circumferential groove receiving said flange, and an entering member slidably and flexibly mounted therein and smaller than the aperture defined by said flange, said gasket being formed with a longitudinal bore which is smaller at its inner end than at its outer end and also normally slightly smaller than the external diameter of said entering member.

3. In a coupling, a receiving member having at its end an annular, inwardly-projecting flange, an entering member passing loosely through the aperture defined by said flange, and a gasket of elastic yielding material slidably embracing said entering member and having an external groove receiving said flange, said gasket projecting radially past both faces of said flange.

4. In a flexible, detachable pipe connection, a receiving member having an inwardly projecting annular flange at each end and an elastic annular gasket interlocked with each flange and adapted to receive by telescoping movement an entering member.

5. In a flexible, detachable pipe connection, a receiving member having an inwardly projecting annular flange at each end and an annular gasket of elastic flexible material located partly inside and partly outside each flange, the outside of each gasket having a circumferential groove in which the corresponding flange is seated, and the interior of each gasket having a bore which is smaller inside said flange than outside the same.

6. A radiator connection for self propelled vehicles, comprising a metal tube adapted to overlap and receive loosely the opposed nipples of a radiator and engine, each end of said tube having an inturned flange, and an annular gasket of flexible elastic material in each end of said tube, each gasket having an external circumferential groove receiving said flange and an internal bore which is smaller at the inner end than at the outer end, the inner bore of said gasket adapted to be slidably and flexibly positioned on said nipples.

In testimony whereof, I hereunto affix my signature.

EDWARD JAMES.